United States Patent [19]

Itoh et al.

[11] Patent Number: 4,934,194
[45] Date of Patent: Jun. 19, 1990

[54] VORTEX FLOWMETER

[75] Inventors: Ichizo Itoh; Toshiyuki Miyata, both of Tokyo, Japan

[73] Assignee: Yokogawa Electric Corporation, Tokyo, Japan

[21] Appl. No.: 304,985

[22] Filed: Jan. 31, 1989

[30] Foreign Application Priority Data

Mar. 24, 1988 [JP] Japan .............................. 63-38942[U]
Apr. 28, 1988 [JP] Japan .............................. 63-57708[U]

[51] Int. Cl.⁵ .............................................. G01F 1/32
[52] U.S. Cl. .................................................. 73/861.22
[58] Field of Search ............ 73/861.22, 861.23, 861.24

[56] References Cited

U.S. PATENT DOCUMENTS 3,638,037  1/1972  McMurtrie ...................... 328/167 X
4,201,084  5/1980  Ito et al. ............................ 73/861.22
4,437,350  3/1984  Tamura et al. ................... 73/861.24

Primary Examiner—Charles A. Ruehl
Attorney, Agent, or Firm—Moonray Kojima

[57] ABSTRACT

A vortex flowmeter comprising a signal converting sensor for converting a flow rate to be measured into a vortex signal, a tracking filter section in a subsequent stage, and a noise discriminating circuit. The tracking filter section receives the output amplitude of the signal converting sensor, changes the corner frequency of a low pass filter, and delivers a filtered signal. The noise discriminating circuit receives a frequency signal obtained by frequency conversion of the filtered signal and the output amplitude of the signal converting sensor, performs a given calculation to achieve noise discrimination, and prevents output of the frequency signal when noise is found.

20 Claims, 15 Drawing Sheets

Fig. 3 (a) (Prior Art)
Signal Stress
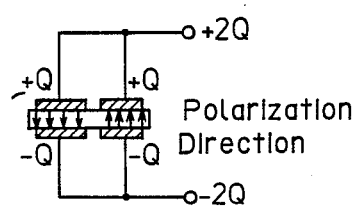
Polarization Direction
Signal Stress Distribution
Fig. 3 (b) (Prior Art)
Vibration in Drag Direction
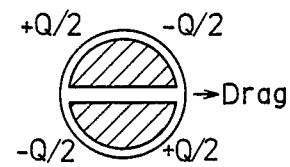
Fig. 3 (c) (Prior Art)
Vibration in Longitudinal Direction
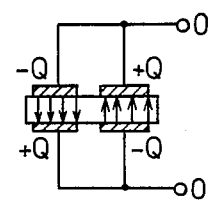
Fig. 4 (Prior Art)
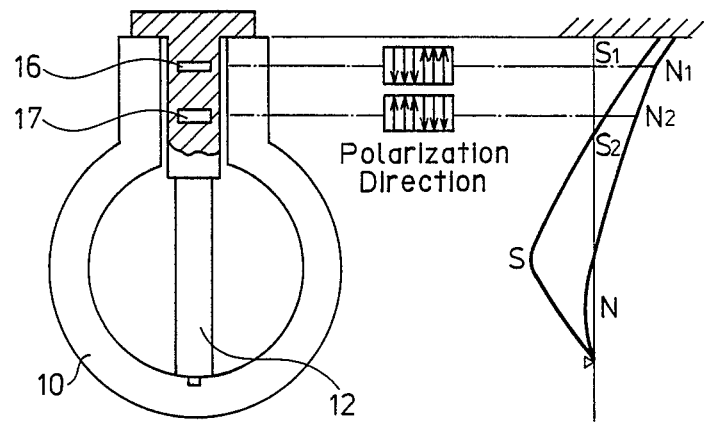
Polarization Direction

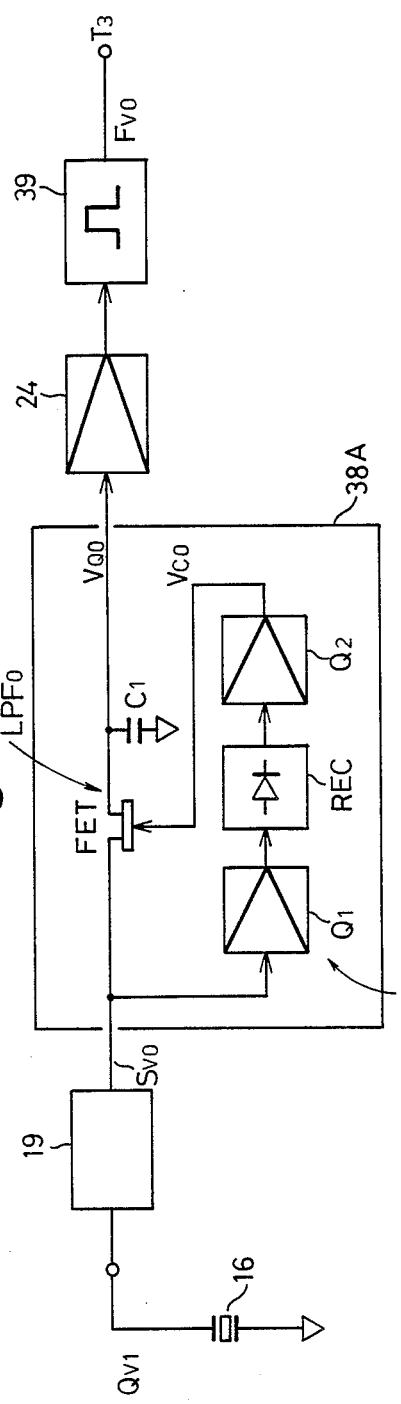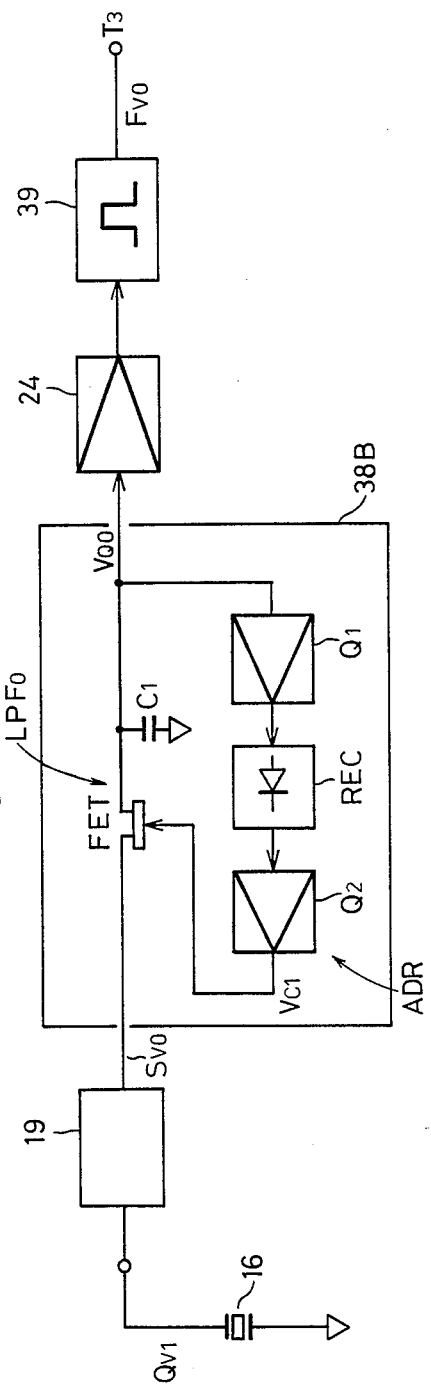

VORTEX FLOWMETER

BACKGROUND OF THE INVENTION

1. Field of the Invention

This invention relates to a vortex flowmeter which converts a flow rate to be measured into an electrical signal using a vortex sensor to provide a vortex signal corresponding to the flow rate to be measured; and more particularly, to an improved vortex flowmeter which is capable of effectively eliminating noise imposed on a vortex sensor to deliver a more reliable vortex signal.

2. Discussion of the Prior Art

A conventional vortex flowmeter is depicted, for example, in FIGS. 1–4, wherein FIG. 1 shows a conventional vortex sensor comprising a pipe line 10 through which a fluid flows, and a cylindrical nozzle 11 attached perpendicular to pipe line 10. A columnar vortex generating member 12 of trapezoidal cross-section is inserted in pipe line 10 perpendicularly thereto with a spacing between member 12 and nozzle 11. One end of member 12 is secured to pipe line 10 by a screw 13 and the other end of member 12 is secured to nozzle 11 at a flange portion 14 by a screw or by welding. A cavity 15 is formed on the side of flange portion 14 of vortex generating member 12. Disposed in cavity 15 is a pair of piezoelectric elements 16 and 17 arranged vertically with a given spacing therebetween. Piezoelectric elements 16 and 17 are sealed and insulated from each other by a sealing member 18 made of glass or the like. Each piezoelectric element 16 and 17 has two electrodes of semi-circular shape disposed on each upper and lower side. The one piezoelectric piece sandwiched between the upper and lower electrodes on the left side of each piezoelectric element 16,17 is polarized in the opposite direction to the other piezoelectric piece sandwiched between the upper and lower electrodes on the right side, so that in response to stresses of the same direction, these piezoelectric pieces generate electric charges of opposite polarities on the upper and lower electrodes thereof.

Vortex signals from the thus configured vortex sensor are applied to the converting unit depicted in FIG. 2. In FIG. 2, electric charges $Q_{V1}$ and $Q_{V2}$ having a frequency corresponding to the vortex frequency of the vortex signals generated by piezoelectric elements 16 and 17 of the vortex sensor are applied to charge converters 19 and 20 where they are converted into AC voltage signals. The voltage signal of the charge converter 19 is added, in an adder 22, to a voltage signal obtained by passing the voltage signal of the charge converter 20 through a rheostat 21. The resultant sum output, after being low-pass filtered by a low-pass filter 23, is amplified by an amplifier 24 to a certain magnitude.

The output of amplifier 24 is applied to a Schmitt trigger 25 having a certain hysteresis width, so that the vortex signal having an amplitude which is larger than the hysteresis width is converted into a pulse signal whose frequency corresponds, one to one, to the vortex frequency.

This pulse signal, after having passed through a transformer 26, which provides DC insulation, is applied to a frequency voltage converter 27 so that it is converted into an analog voltage signal whose span is determined by a rheostat 28.

This voltage signal controls the base current of a transistor 31 via a DC amplifier 30 whose zero point is set by a rheostat 29, so that it is converted into a current output $I_L$. This current output is transmitted, through the collector terminal and emitter teminal of the transistor, and the output terminals $T_1$ and $T_2$, to a receiving resistor $R_L$ of a receiving instrument having an external power source $E_S$. As will be appreciated, a feedback resistor $R_f$ is inserted between the transistor 31 and the output terminal $T_2$, and a feedback voltage $E_f$ generated across this feedback resistor $R_f$ is fed back to the input end of DC amplifier 30 so that the current output $I_L$ is controlled within the range of 4 to 20 mA corresponding to a voltage signal at the input.

A base part, of about 4 mA, out of the current output $I_L$ is used to create an internal power source for the converting unit. That is, a part of the current output is supplied through a constant current circuit 32 to a constant voltage circuit 33 which generates a reference voltage. This is used to generate a zero voltage across the rheostat 29. Furthermore, another part of the 4 mA current is supplied through a transistor 34 to a DC-AC converting circuit 35 where it is converted into an AC voltage. The thus converted AC voltage is supplied through a transformer 36 to an internal power source circuit 37. Circuit 37 creates internal voltages $+V$ and $-V$ necessary for operation of the converting unit.

The operation of the embodiment will now be described with reference to FIGS. 3(a)-3(c), and FIGS. 4. Upon flowing of a fluid, due to Karman vortices, vibration is generated on vortex generating member 12 of FIG. 1 in the directions of the double arrow F. Due to this vibration, a stress distribution and a counter stress distribution repeatedly appear, as shown in FIG. 3(a), on the vortex generating member 12. As a result, electric charges $+Q$ and $-Q$ repeatedly appear on each piezoelectric element 16,17, which correspond to a signal stress, as shown in FIG. 3(a), having the same frequency as the vortex frequency.

On the other hand, pipe line 10 involves pipe line vibration other than the above which will cause noise. The pipe line vibration is classified into components of three directions. (1) The drag direction which is in accord with the flowing of the fluid. (2) The buoyancy direction which is perpendicular to the flowing of the fluid. (3) The longitudinal direction of the vortex generating member. Among the foregoing, the stress distribution relating to the drag direction vibration becomes as shown in FIG. 3(b). That is, the positive and negative charges are cancelled out in each electrode to result in no noise charge. Furthermore, any charges due to the longitudinal direction vibration are cancelled out in the electrodes, as shown in FIG. 3(c), to result in no noise charge, similar to the case of the drag direction.

However, the vibration of the buoyancy direction F exhibits the same stress distribution as the signal stress to result in some noise charges. Accordingly, the following processing is performed for the purpose of eliminating such noise charges. Taking $Q_{V1}$ and $Q_{V2}$ as the respective charges of the piezoelectric elements 16,17, $S_1$ and $S_2$ as the signal components, and $N_1$ and $N_2$ as the noise components in the buoyancy direction, with the piezoelectric elements 16,17 being oppositely polarized, the $Q_{V1}$ and $Q_{V2}$ are given by the following expressions.

$$Q_{V1} = S_1 + N_1$$

$$-Q_{V2} = -S_2 - N_2$$

provided that $S_1$ and $S_2$ and $N_1$ and $N_2$ have the same vector direction.

The relationship between the signal components and the noise components of the piezoelectric elements 16 and 17 is such as that shown in FIG. 4 which illustrates the relationship of the bending moment of the vortex generating member with respect to the noise and signal in the buoyancy direction. Thus, when the output of the charge converter 20 on the side of piezoelectric element 17 is multiplied by a factor of $N_1/N_2$, using rheostat 21, and then added to the output of charge converter 19, the following is obtained so that the pipe line noise is eliminated.

$$Q_{V1} - Q_{V2}(N_1/N_2) = S_1 - S_2(N_1/N_2)$$

In this manner, with a two element system, among the noises imposed on the vortex generating member, the noises in the drag direction and the longitudinal direction of the vortex generating member can be eliminated by paying attention to the polarities of the piezoelectric elements 16,17. Also, the noise in the buoyancy direction can be eliminated by paying attention to the balance between the piezoelectric elements 16,17.

Furthermore, other noises due to the presence of variations in property of the piezoelectric elements 16,17 and/or due to some defective adjustment for noise balance of the rheostat 21 can be eliminated by insertion of the low pass filter 23 in the converting unit.

However, although the foregoing conventional type of vortex flowmeter can exert a certain function of noise elimination where noise has only an ordinary magnitude, such a function is not sufficient if the magnitude of noise exceeds such ordinary magnitude.

SUMMARY OF THE INVENTION

Consideration of the defects of conventional vortex flowmeter reveals the following.

1. Where the flow rate becomes so high as to generate a vortex frequency of, for example, 1 KHz, because of the resonating of the vortex generating member 12, large amplitude high frequency noise of about 2 KHz, two times the vortex frequency is generated. Such large amplitude noise, attributable to the property of the vortex flowmeter, cannot be eliminated by the low pass filter 23. As a result, noise is delivered at the output end of amplifier 24 with a level higher than the Schmitt level of Schmitt trigger 25, so that in addition to the subject vortex signal, pulses caused by the noise are delivered as an error output.

Although the delivery of such an error output can be prevented by expanding the hysteresis width ΔH of a the Schmitt trigger, if such delivery is made, conversely, the signal level becomes low in the range low flow rate because of the rate range, where no measurement would be possible, expands disadvantageously.

2. Some noise is generated even when the flow rate is zero, and such noise, if increasing in magnitude, cannot be eliminated by the low pass filter 23. As a result, the noise is delivered at the output end of amplifier 24 with a level which is higher than the Schmitt level of the Schmitt trigger 25, so that it is detected by the Schmitt trigger 25 and the current output $I_L$ is delivered. This results in a so called zero drift.

3. Furthermore, since the vortex flowmeter is generally attached to a piping or the like, if an impulse is applied to the piping, pulse like impulse wave noise which is an electric signal converted by the vortex generating member from such an impulse is applied to the converting unit with a comparatively large amplitude, so that such noise cannot be eliminated by the low pass filter 23 of the converting unit. Thus, the noise is superposed on the current output as an indication fluctuation.

In view of the foregoing, it is an object of the invention to eliminate output fluctuations of the vortex flowmeter resulting from noise.

Specifically, a first object is to provide means for fully eliminating noise of such large magnitude as cannot be eliminated by a conventional low pass filter. A second object is to provide means for eliminating a zero drift resulting from noise appearing on a vortex generating member when the flow rate is zero. A third object is to provide means for effectively eliminating pulse like impulse wave noise.

The foregoing and other objects are attained by the invention which encompasses a noise free vortex flowmeter comprising a converting means for converting a flow rate to be measured into a vortex signal; as a first item, a tracking filter section for changing the corner frequency of a low pass filter using a signal relating to the amplitude of the output of the converting means and for delivering a filtered signal of the output of the converting means, and frequency converting means for converting the filtered signal into a frequency signal corresponding to the flow rate to be measured; as a second item, noise discrimination means for performing a given calculation using the amplitude of the output of the converting means and the frequency signal of the first item, deciding whether the frequency signal is resulting from noise or not, and delivering, when it is resulting from noise, an OFF signal to prevent the delivery of the frequency signal; and as a third item, integrating means for eliminating impulse like pulse noise using the difference of time constants during the calculating processing of the second item.

BRIEF DESCRIPTION OF THE DRAWINGS

FIGS. 3(a)–3(c) are schematic diagrams depicting the state of electric charges appearing on piezoelectric elements of the vortex sensor.

FIG. 4 is a schematic diagram depicting the eliminating of noise in the buoyancy direction generated in the vortex sensor.

FIGS. 5(a) and 5(b) are block diagrams depicting a tracking filter section for eliminating high frequency noise, with FIG. 5(a) depicting an embodiment wherein high frequency noise is detected from the input side of the tracking filter section; and FIG. 5(b) depicting another embodiment wherein high frequency noise is detected from the output side of the tracking filter section.

DETAILED DESCRIPTION OF THE PREFERRED EMBODIMENTS

Figure 1:
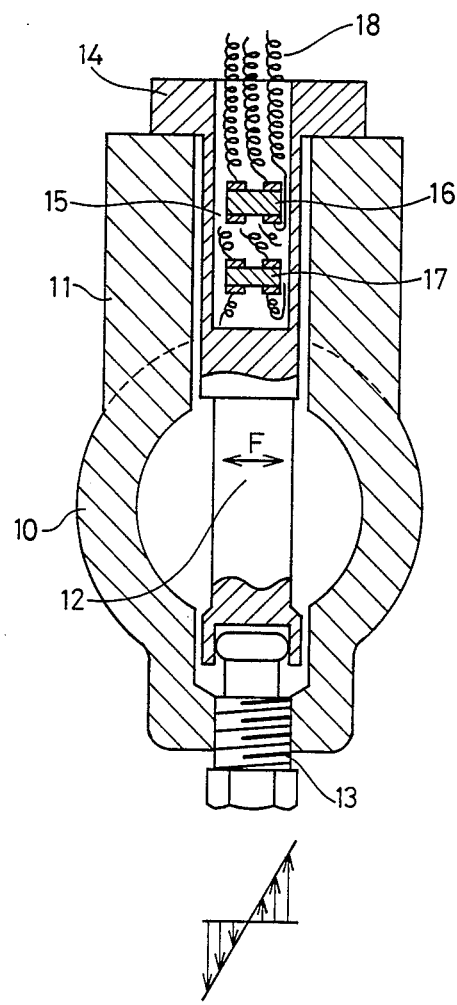
FIG. 1 is a vertical sectional view depicting a vortex sensor of a vortex flowmeter which converts vortices into electrical signals.

FIGS. 5(a) and 5(b) are block diagrams showing a tracking filter section for eliminating high frequency noise, with FIG. 5(a) showing the high frequency noise being detected from the input end of the section and FIG. 5(b) showing the high frequency noise being detected from the output end of the section.

Although a vortex sensor actually comprises two piezoelectric elements 16 and 17, the following description will be of only element 16 as representative of both, in order to simplify the explanation. Also, for similar reasons, the components which achieve the same function as those in the conventional apparatus are designated by the same reference numerals and no further explanations thereof will be given hereat. Also, since the structure of FIG. 5(b) differs from that of FIG. 5(a) only in terms of the detecting point at which high frequency noise is detected, the following description will be only of FIG. 5(a) to simplify the explanation.

In the embodiments of FIGS. 5(a) and 5(b), on the basis of the feature of the vortex flowmeter wherein the amplitude of a vortex signal as well as the intensity of noise superposed on the vortex signal increases in proportion to the product of $\rho$ (density) and $V^2$ (which is the flow rate squared), the corner frequency of a low pass filter is changed after detecting the amplitude of the vortex signal.

The piezoelectric element 16 detects a stress variation of the vortex frequency, corresponding to a flow rate $Q_M$ to be measured, in the form of a charge variation and generates an output signal in the form of a vortex charge $Q_{V1}$.

The vortex charge $Q_{V1}$ is converted by a charge converter 19, acting as a signal converting means, into an AC vortex signal $S_{V0}$ which is applied to a tracking filter section 38A. Tracking filter section 38A cuts off from the vortex signal $S_{V0}$ the frequency components which are higher than a given corner frequency, and then outputs a filtered AC signal $V_{Q0}$. This filtered AC signal $V_{Q0}$ is amplified by an amplifier 24, to a certain level, and then is applied to a Schmitt trigger circuit 39 which acts as a frequency converter means.

Schmitt trigger circuit 39, using its hysteresis width $\Delta H$ as a threshold value, converts the AC output of amplifier 24 into a frequency signal $F_{V0}$, which is outputted at terminal $T_3$.

The internal structure of tracking filter section 38A, which is an important portion of the embodiment, will now be described in greater detail. Vortex charge $Q_{V1}$ is converted by charge converter 19 into AC vortex signal $S_{V0}$. After passing through low pass filter LPF$_0$, vortex signal $S_{V0}$ is outputted as filtered AC signal $V_{Q0}$. Low pass filter LPF$_0$ comprises an internal resistance $R_1$ of a field effect transistor FET and a capacitor $C_1$ and having a given corner frequency $f_c$.

On the other hand, vortex signal $S_{V0}$ is also amplified by an amplifier $Q_1$ to a certain level, then converted by a rectifying circuit REC into a DC voltage, then the converted DC output is inverted by an inverting amplifier $Q_2$ into a control signal $V_{C0}$ which is then applied to the gate terminal of field effect transistor FET. Amplifier $Q_1$, rectifying circuit REC, and inverting amplifier $Q_2$ form an amplitude detecting means ADR.

Since the internal resistance between the source terminal and drain terminal of the field effect transistor FET, acting as a changing means for changing the corner frequency $f_c$, varies in accordance with its gate voltage, the corner frequency $f_c(f_c=(\frac{1}{2})\pi R_1 \cdot C_1)$ of low pass filter LPF$_0$ can be changed by control signal $V_{C0}$ from amplitude detecting means ADR.

In the circuit of FIG. 5(a), in response to increase in value (negative) of control signal $V_{C0}$, the internal resistance of field effect transistor FET increases and the corner frequency $f_c$ decreases.

Accordingly, since control signal $V_{C0}$ increases to lower corner frequency $f_c$ when flow rate $Q_M$ to be measured becomes high to increase the amplitude of the vortex signal $S_{V0}$, the rate of decrease of high frequency noise $N_Z$ superposed on vortex signal $S_{V0}$ becomes relatively high as compared with the case where the amplitude of the vortex signal $S_{V0}$ is small.

In the case of tracking filter section 38B of FIG. 5(b), the amplifier $Q_1$ detects the filtered signal $V_{Q0}$ of the low pass filter LPF$_0$, its output is converted by rectifying circuit REC into a DC voltage, and the thus converted voltage is inverted by inverting amplifier $Q_2$ into a control signal $V_{C1}$ which is applied to the gate terminal of field effect transistor FET so that the internal resistance of the transistor FET is controlled to change the corner frequency.

Figure 2:
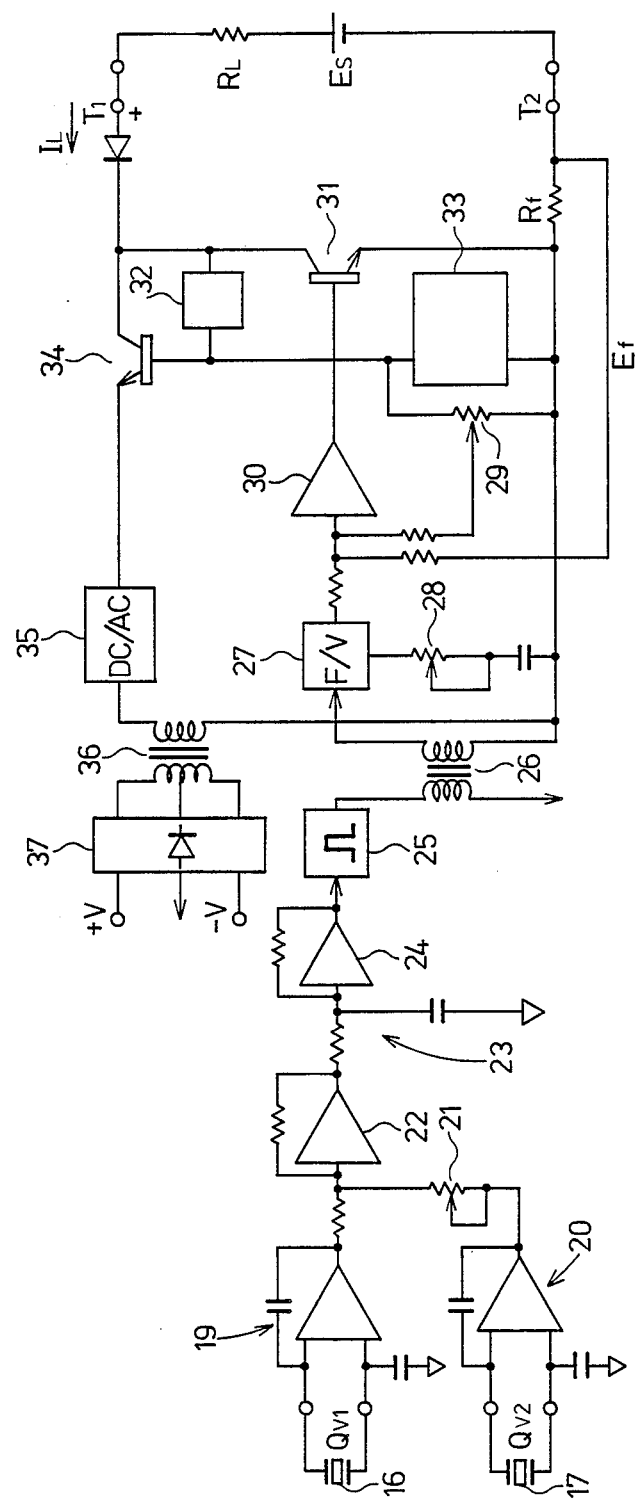
FIG. 2 is a block diagram depicting a converting unit connected with the vortex sensor.
Figures 6A, 6B:
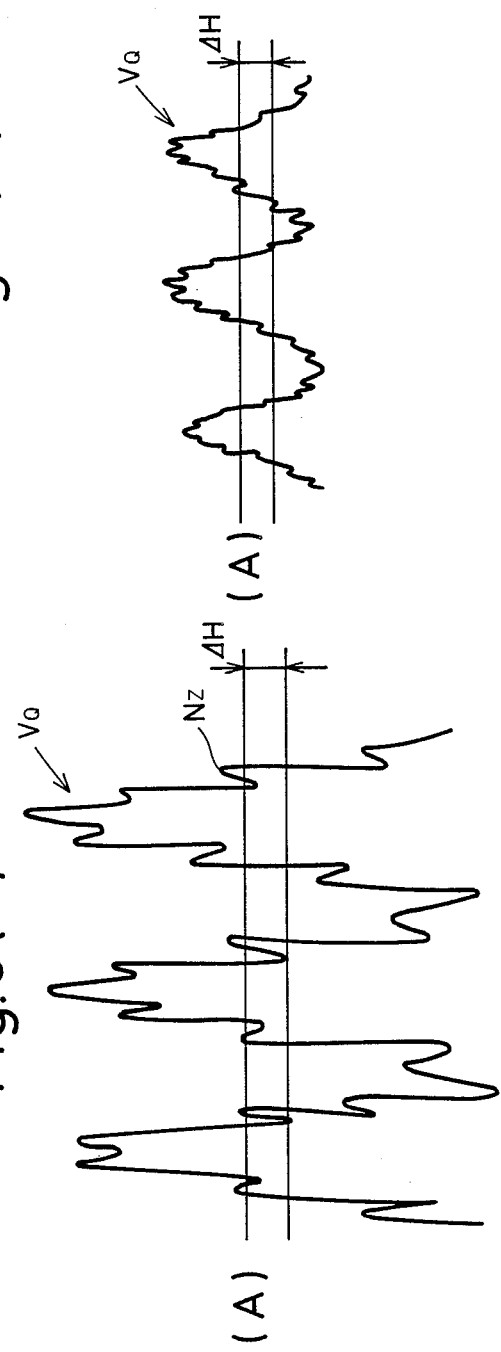
FIGS. 6(a), lines (A) and (B), and 6(b), lines (A) and (B), are waveform diagram depicting operation of the tracking filter section.

FIGS. 6(a), comprising lines (A) and (B), and 6(b), comprising lines (A) and (B), are waveform diagrams used to explain the function of tracking filter section 38A when the amplitude of vortex signal $S_{V0}$ is large. FIG. 6(a), lines (A) and (B) are directed to the conventional fixed low pass filter shown in FIG. 2. FIG. 6(b), lines (A) and (B) are directed to the embodiment shown in FIG. 5(a) wherein line (A) shows the waveform of filtered signal $V_{Q0}$ of tracking filter section 28A, and line (B) shows the waveform of frequency signal $F_{V0}$ or the output of Schmitt trigger 39.

In FIG. 6(a) which is directed to the prior art, since the corner frequency $f_c$ of low pass filter 23 (see FIG. 2) is fixed, in response to the increase in amplitude of vortex signal $S_V$, the high frequency noise $N_Z$ superposed on the vortex signal increases (see FIG. 6(a), line (A)). This noise is caught by the hysteresis width $\Delta H$ of Schmitt trigger 25. As a result, a noise frequency $F_N$ due to high frequency noise, is contained in frequency signal $F_V$, as shown in FIG. 6(a), line (B), thus resulting in an error.

On the other hand, in the invention, the amplitude of the vortex signal is detected using the embodiment of FIG. 5. The corner frequency $f_c$ of low pass filter $LPF_0$ is lowered in inverse proportion to the amplitude of the vortex signal $S_{V0}$ so that even if the amplitude of vortex signal $S_{V0}$ increases and high frequency noise $N_Z$ superposed on the vortex signal increases, as shown in FIG. 6(b), line (A), a high frequency noise component contained in the filtered signal $V_{Q0}$ of tracking filter section 38A relatively decreases. Thus, noise is never caught by the hysteresis width $\Delta H$ of Schmitt trigger 39 and, as shown in FIG. 6(b), line (B), noise frequency $F_N$ is never contained in frequency signal $F_{V0}$.

Figure 7:
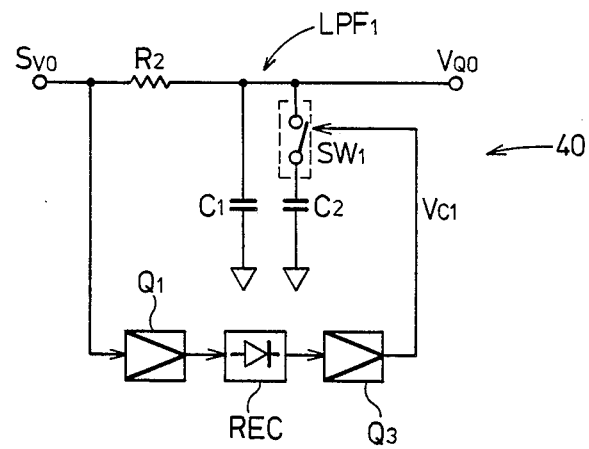
FIGS. 7(a)–7(c) are block diagrams depicting a first set of modified structures of the cracking filter section.
Figure 7:
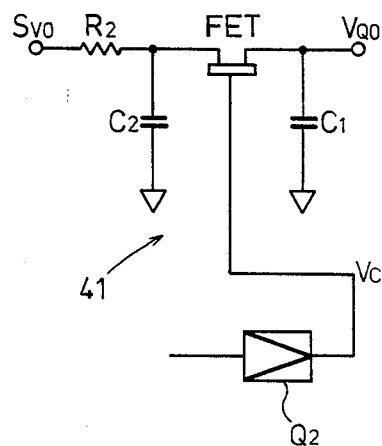
Figure 7:
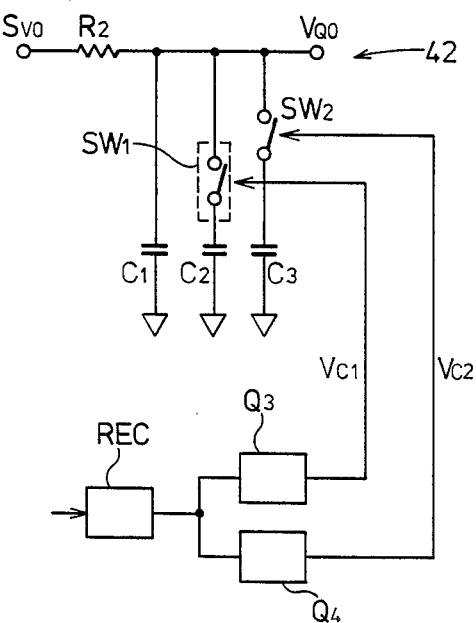

FIGS. 7(a)-7(c) are block diagrams of other embodiments of the tracking filter section. FIG. 7(a) shows a tracking filter section wherein a fixed resistor $R_2$ is substituted for field effect transistor FET of the low pass filter $LPF_0$ shown in FIG. 5(a); a series circuit, comprising a capacitor $C_2$ and switch $SW_1$, is connected across capacitor $C_1$; and the output of rectifying circuit REC is applied to a comparator $Q_3$.

In response to increase in amplitude of vortex signal $S_{V0}$, the output of rectifying circuit REC increases. Comparator $Q_3$ compares the output of rectifying circuit REC with a reference value held therein and generates as a result a control output $V_{C1}$ when that output is in excess of the reference value. Control output $V_{C1}$ is applied to switch $SW_1$ to cause it to be switched ON to lower the corner frequency of low pass filter $LPF_1$.

FIG. 7(b) shows an important portion of a tracking filter section 41 whose filtering effect is enhanced by the use of a combination of a fixed filter and a variable low pass filter. The low pass filter comprises a field effect transistor FET and a capacitor $C_1$.

FIG. 7(c) shows an important portion of a tracking filter section 42 comprising two comparators and two switches. In addition to the structure shown in FIG. 7(a), a series circuit comprising switch $SW_2$ and capacitor $C_3$ is connected in parallel to capacitor $C_1$, wherein switch $SW_2$ is switched ON by control output $V_{C2}$ applied from comparator $Q_4$ when the amplitude of vortex signal $S_{V0}$ is large. With the foregoing structure, very fine control is realized.

In the embodiments of FIGS. 5(a), 5(b) and 7(a), 7(b), 7(c), on the basis of the fact that the high frequency noise becomes large when the amplitude of the vortex signal is large, when the amplitude of the vortex signal is large, the corner frequency of the low pass filter is made low so as to cut off high frequency components, so that errors, due to high frequency noise, are effectively prevented from being generated.

Figure 8:
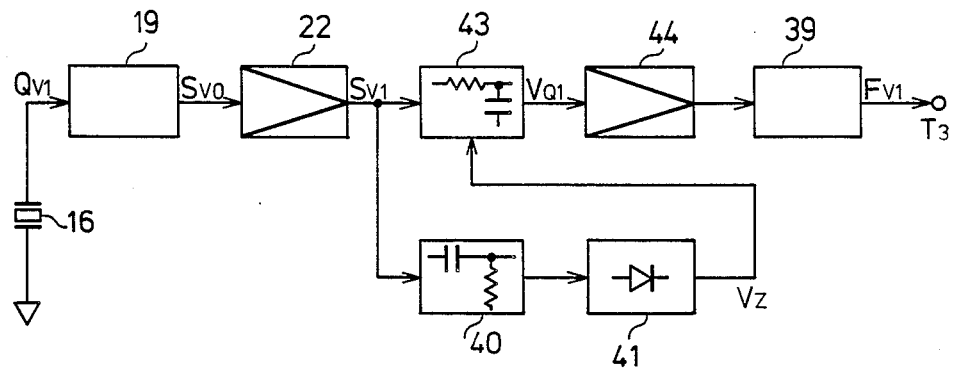
FIGS. 8(a) and 8(b) are block diagrams showing a second set of modified structures of the tracking filter section.
Figure 8:
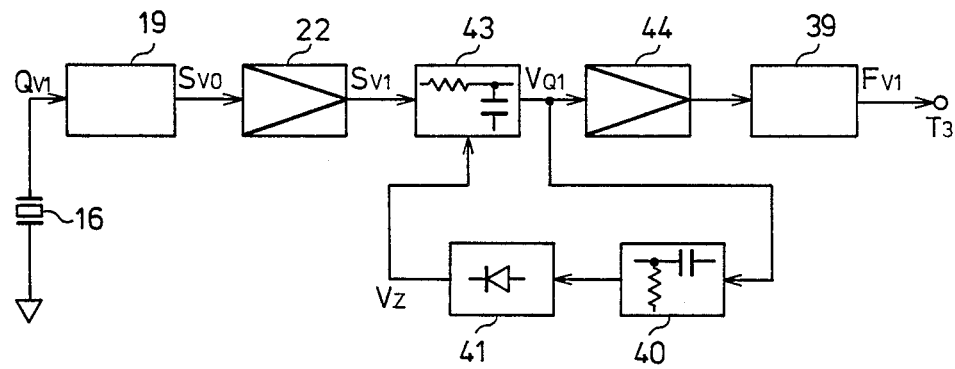

FIGS. 8(a) and 8(b) are block diagrams showing a second set of modifications of the tracking filter section of FIG. 5(a), 5(b). In these embodiments, the vortex signal is passed through a high pass filter to change the corner frequency of the low pass filter. Since the structure of FIG. 8(b) differs from that of FIG. 8(a) only in the detecting point of detecting the high frequency noise, as in the case of FIG. 5(a), 5(b), only FIG. 8(a) will be described.

Vortex charge $Q_{V1}$, generated by piezoelectric element 16, is converted by charge converter 19, acting as the signal converting means, into AC vortex signal $S_{V0}$ which is applied to an amplifier 22. The vortex signal thus amplified is delivered to a low pass filter 43 in the form of a vortex signal $S_{V1}$.

Low pass filter 43 cuts off from vortex signal $S_{V1}$ the frequency components which are higher than a given corner frequency and generates a filtered AC output $V_{Q1}$, which is applied to and amplified to a certain level by an amplifier 44. The amplified signal is outputted by amplifier 44 to Schmitt trigger 39 which acts as a frequency converting means.

Schmitt trigger 39, using its hysteresis width $\Delta H$ as the threshold value, converts AC output from amplifier 44 into a frequency $F_{V1}$ which is outputted at terminal $T_3$.

Further, vortex signal $S_{V1}$, appearing at the output end of amplifier 22, is additionally delivered to a high pass filter 40. Thus, high frequency noise $N_Z$, contained in vortex signal $S_{V1}$, is detected by high pass filter 40 and delivered to a rectifying circuit 41 of the subsequent stage. Rectifying circuit 41 rectifies the high frequency noise $N_Z$ into an analog noise voltage $V_Z$ corresponding thereto. Signal voltage $V_Z$ appears at the output end of rectifying circuit 41 and is delivered to low pass filter 43 to cause the change in the corner frequency $f_c$ thereof.

In the case of FIG. 8(b), high pass filter 40 detects the filtered signal $V_{Q1}$ of low pass filter 43, whose output is converted by rectifying circuit 41 into a DC voltage, so that the corner frequency of low pass filter 43 is changed by the DC voltage thus converted.

Figure 9:
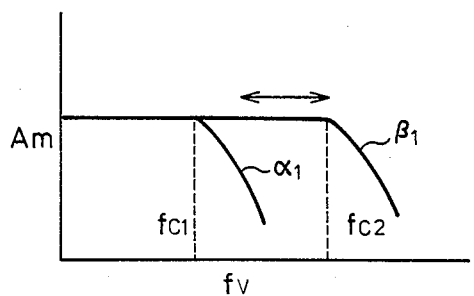
FIG. 9 is a waveform diagram depicting operation of the tracking filter section.

The operation of the embodiment of FIG. 8(a) will now be described with reference to FIG. 9 which shows the frequency characteristic of low pass filter 43, wherein the horizontal axis denotes vortex frequency $f_v$ and the vertical axis denotes amplitude $A_m$. A curve $\alpha_1$ represents a frequency characteristic having a corner frequency $f_{c1}$ and another curve $\beta_1$ represents another frequency characteristic having another corner frequency $f_{c2}$.

When the level of high frequency noise $N_Z$ contained in vortex signal $S_{V1}$ becomes high, the corresponding noise voltage $V_Z$ increases. As a result, corner frequency of low pass filter 43 shifts downward, for example, from $f_{c2}$ to $f_{c1}$, so that the amount of attenuation with respect to high frequency noise $N_Z$ increases. On the contrary, when the level of high frequency noise $N_Z$ becomes low, the corresponding noise voltage $V_Z$ decreases. As a result, the corner frequency of low pass filter 43 shifts upward, for example, from $f_{c1}$ to $f_{c2}$, so that the amount of attenuation with respect to high frequency noise $N_Z$ decreases.

For example, where the corner frequency of low pass filter 43 is $f_{c2}$ or frequency characteristic curve $\beta_1$ is selected, if vortex signal $S_{V1}$ is close to corner frequency $f_{c2}$ or oversteps $f_{c2}$, the attenuation of vortex signal $S_{V1}$ occurs. However, since the frequency of vortex signal $S_{V1}$ is generally lower than resonance frequency $f_n$ of vortex generating member 12, which is the source of generation of high frequency noise $N_Z$, the amount of attenuation of vortex frequency $f_v$ is small. Further, when the level of high frequency noise $N_Z$ is high, or when the value of $\rho V^2$ is large, the level of vortex signal $S_{V1}$ is also high, so that practically there occur no adverse effects.

In the embodiments of FIGS. 8(a) and 8(b), the high frequency noise superposed on the vortex signal is detected. If the noise increases, the corner frequency of the low pass filter is lowered correspondingly to attenuate the high frequency noise. Thus, even if the high frequency noise becomes large, the output reliability of the vortex flowmeter is ensured. Thus, the measurable range of flow rate can cover a higher flow rate than the prior art, and a high pressure gaseous substance or high temperature steam of large $\rho V^2$ can also be measured reliably.

Figure 10:
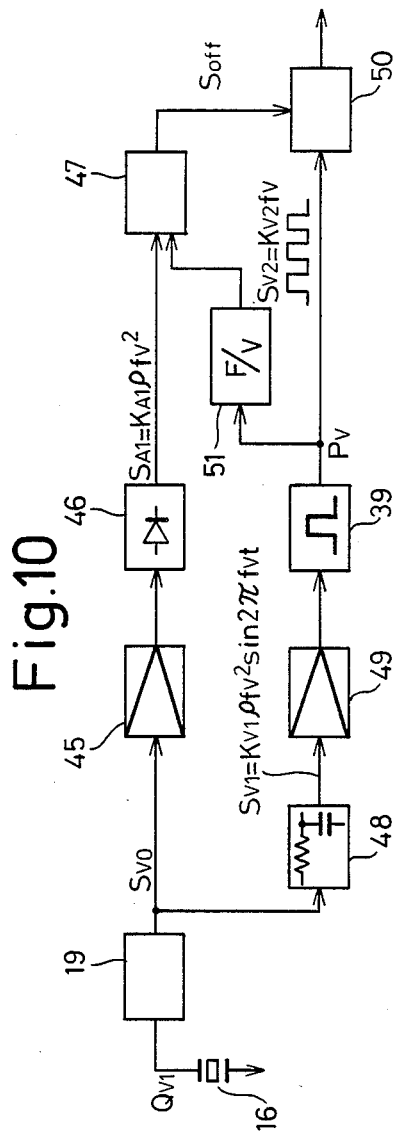
FIG. 10 is a block diagram depicting an arrangement for deciding whether an output frequency is resulting from a vortex signal or from noise in accordance with the amplitude of the output frequency.

FIG. 10 depicts a noise discriminating circuit for deciding whether the output frequency is a result of the vortex signal or the noise, on the basis of the amplitude of the output frequency. The vortex signal $S_{V0}$, converted by charge converter 19 into a voltage, is amplified by an amplifier 45 and is applied to and rectified by rectifying circuit 46, and is outputted as a DC vortex signal $S_{A1}$ and delivered to one input end of a comparator 47 of a subsequent stage, acting as a noise discriminating means.

Vortex signal $S_{A1}$ has a value which depends on the amplitude of the original vortex signal and, using $K_{A1}$ as a constant, is given by the following expression, with $f_v$ being the vortex frequency.

$$S_{A1} = K_{A1} \rho f_v^2 \qquad (1)$$

On the other hand, vortex signal $S_{V0}$ is also delivered to and filtered by a low pass filter 48 to generate an AC vortex signal $S_{V1}$ which is outputted at the output end of low pass filter 48. Although vortex signal $S_{V1}$ has a value depending on the amplitude of the original voltage signal, vortex signal $S_{V1}$ varies like a sine wave corresponding to vortices generated by vortex generating member 12.

Taking $K_{V1}$ as a constant and $f_v$ as the vortex frequency, vortex signal $S_{V1}$ is given by the following expression.

$$S_{V1} = K_{V1} \rho f_v^2 \sin 2\pi f_v \qquad (2)$$

Vortex signal $S_{V1}$ is amplified by an amplifier 49 and is applied to Schmitt trigger 39. Vortex signal $S_{V1}$ is converted by Schmitt trigger 39, using its Schmitt width $\Delta H$ as a boundary, into a vortex pulse $P_v$ and delivered to a gate circuit 50. Vortex pulse $P_v$ is also converted by a frequency voltage converter 51 into an analog vortex signal $S_{V2}$, which is independent of the amplitude of vortices but corresponds to the vortex frequency $f_v$. Signal $S_{V2}$, is delivered to the other input end of comparator 47. Vortex signal $S_{V2}$ is given by the following expression, using $K_{V2}$ as a constant.

$$S_{V2} = K_{V2} f_v \qquad (3)$$

The comparator 47 compares vortex signal $S_{A1}$ which is the outputted from rectifying circuit 46 with vortex signal $S_{V2}$ which is the output from frequency voltage converter 51. When the relationship $S_{A1} < S_{V2}$ holds, comparator 47 determines that vortex frequency $f_v$ is really resulting from noise, not from the vortex, and delivers an OFF signal $S_{off}$ to gate circuit 50 to switch "off" the output of Schmitt trigger 39. When the relationship $S_{A1} > S_{V2}$ holds, gate circuit 50 is switched "on" to deliver the vortex pulse $P_v$.

The operation of the just described circuit will now be described with reference to FIG. 11, wherein the horizontal axis denotes vortex frequency $f_v$, and the vertical axis represents vortex signals $S_{A1}$ and $S_{V2}$.

The constants $K_{A1}$ and $K_{V2}$ of above expressions (1) and (3) are selected so that when the vortex signal appearing at the output end of amplifier 49 reaches the trigger level $S_T$ of Schmitt trigger 39 in terms of magnitude (which is point Z in FIG. 11), vortex signals $S_{A1}$ and $S_{V2}$ become identical. Furthermore, the value of trigger level $S_T$ for the above condition is selected to be the magnitude of the vortex signal corresponding to the lower limit of the flow rate to be measured.

Figure 11:
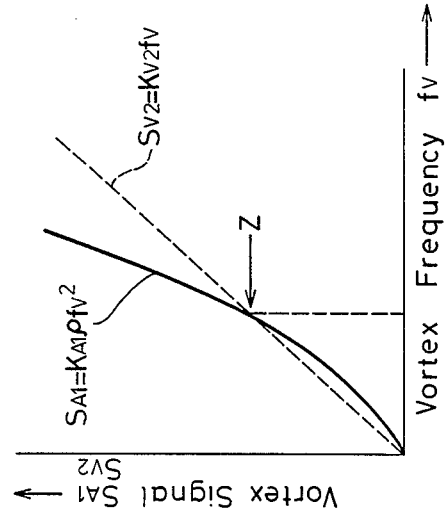
FIG. 11 is a diagram depicting operation of the embodiment of FIG. 10.

With the constants $K_{A1}$ and $K_{V2}$ being selected as described above and when the fluid to be measured is flowing with a flow rate of $Q_M$ higher than the lower limit of the flow rate and falling within the measurable range, the relationship $S_{A1} > S_{V2}$ holds as will be appreciated from FIG. 11, so that comparator switches "on" gate 50 to deliver vortex pulse $P_v$ so obtained.

On the other hand, when flow rate $Q_M$ to be measured is zero, but when large noise is generated due to the vibration of the piping or the like, since no output is resulting from flow rate $Q_M$, the coefficient of density $\rho$ in expression (1) is absent. As a result, generally, the relationship $S_{A1} < S_{V2}$ holds. Thus, an OFF signal is delivered from the output end of comparator 47 to switch "off" gate circuit 50, so that no pulse is delivered from gate circuit 50.

As described, with comparator 47 acting as a noise discriminating means, comparator 47 decides whether the pulse signal $P_v$ is resulting from/the vortex signal or from noise, and when the pulse is determined to be a result of noise, it can be eliminated.

Figure 12:
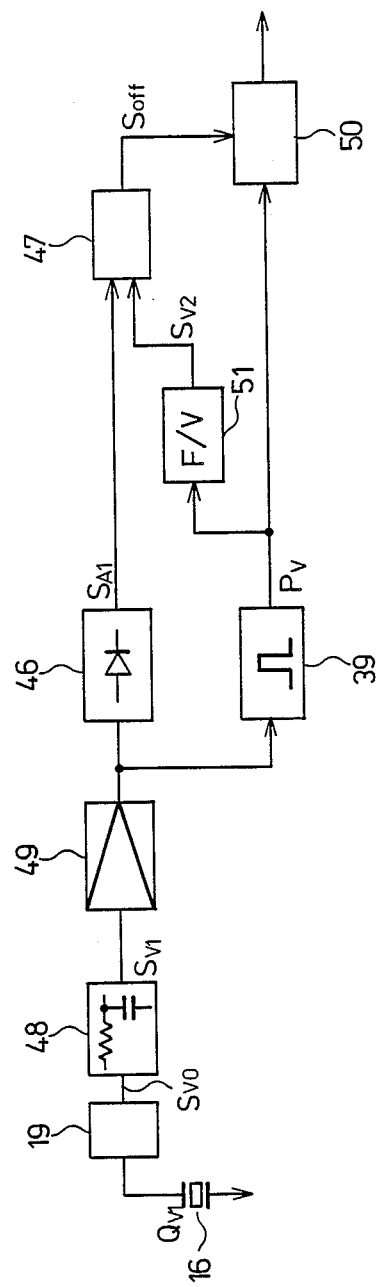
FIG. 12 is a block diagram depicting a modification of the embodiment of FIG. 10.

FIG. 12 depicts another modification of the embodiment of FIG. 10, wherein although low pass filter 48 is made independent of amplifier 45, these structural components are combined in the embodiment of FIG. 12. Thus, amplifier 45 of FIG. 10 can be eliminated.

Figure 13:
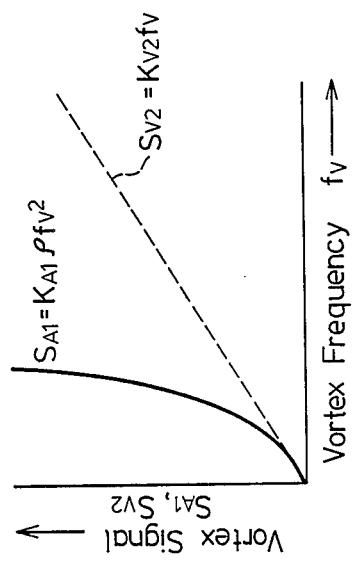
FIG. 13 is a characteristic diagram depicting operation of the embodiment of FIG. 10 with its constants being set differently.

FIG. 13 is a graph for explaining the operation of the embodiment of FIG. 10 with its constants being set differently. Although in the embodiment of FIG. 10, the constants $K_{A1}$ and $K_{V2}$ are selected so as to give $S_{A1} \approx S_{V2}$ at the crossing point Z shown in FIG. 11, this is not critical. However, the constants $K_{A1}$ and $K_{V2}$ may be set so as to always give $S_{A1} > S_{V2}$ and not to create crossing point Z, shown in FIG. 13.

In the above case, when the fluid of $Q_M$ to be measured is flowing, the state of $S_{A1} > S_{V2}$ is always preserved and vortex pulse $P_v$ is delivered from gate circuit 50. However, when a large amount of noise is generated with the flow rate being zero, such noise is delivered with the absence of density $\rho$. Thus, the relationship $S_{A1} < S_{V2}$ results and an OFF signal $S_{off}$ is delivered from comparator 47 to circuit 50 to prevent the pulse signal from being outputted from gate circuit 50.

In this way, it is possible to decide whether the pulse is a result of the vortex or from noise.

If the time constant of rectifying circuit 46 is made substantially identical with that of Schmitt trigger 39, the capability of tracking with respect to a flow rate variation is enhanced. This feature is effective in handling a pulsing type of flow.

Figure 14:
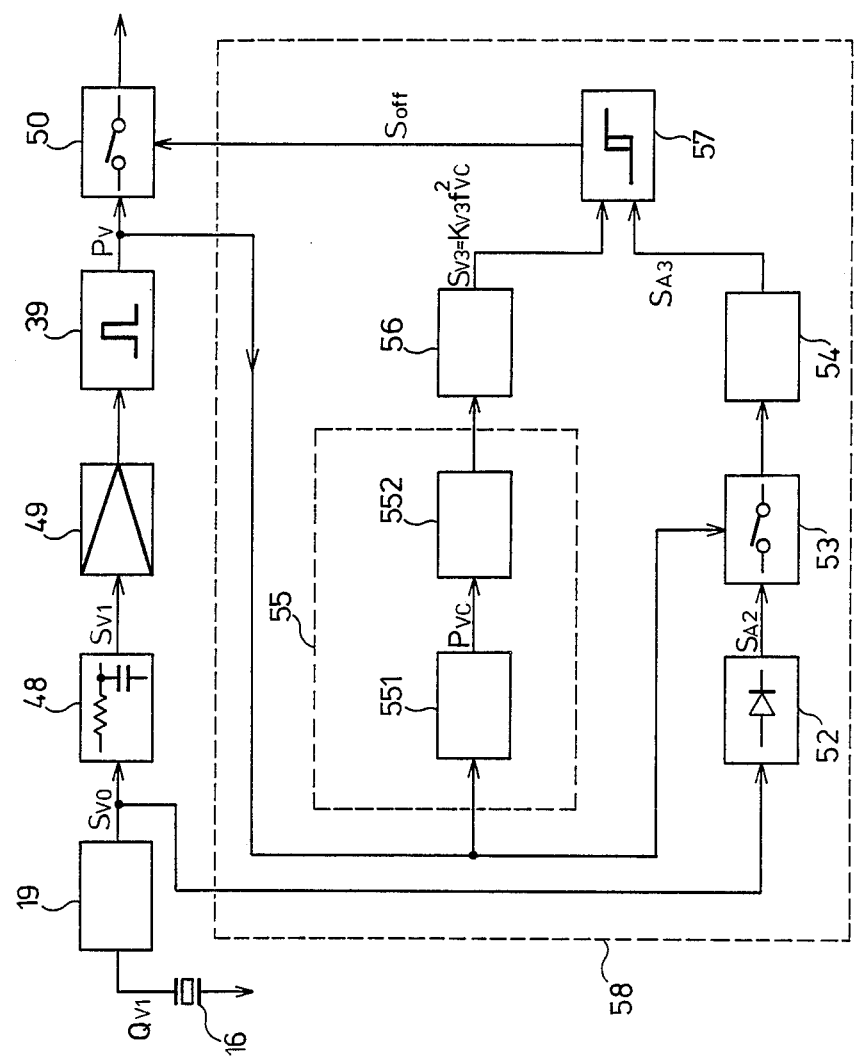
FIG. 14 is a block diagram depicting an embodiment which has, in addition to the function shown in FIG. 12, the function of eliminating impulse wave noise.

FIG. 14 depicts a circuit which ensures that both the function achieved in FIG. 12 and a noise eliminating function are effective for impulse type wave noises. Piezoelectric element 16, charge converter 19, low pass filter 48, amplifier 49, Schmitt trigger 39, and gate circuit 50 are identical in structure with those shown in FIG. 10. Vortex signal $S_{V0}$ appearing at the output end of charge converter 19 is applied to and rectified by a rectifying circuit 52, so that a vortex signal $S_{A2}$, which is proportional to the amplitude of the original vortex signal, is delivered at the output end of rectifying circuit 52. Vortex signal $S_{A2}$, after passing through switch circuit 53, and being switched "on" and "off" in synchronization with pulse signal $P_v$, is integrated by an integrating circuit 54, so that the thus integrated signal is delivered in the form of a vortex signal $S_{A3}$ at the output end of integrating circuit 54. In this case, or where pulse signal $P_v$ is derived from the vortex signal, since switch circuit 53 is switched "on" and "off" by a pulse having a duty ratio of about 50%, vortex signal $S_{A3}$, appearing at the output end of integrating circuit 54, becomes proportional to vortex frequency $f_v$. Thus, taking $K_{A3}$ as a constant, vortex signal $S_{A3}$ is given by the following.

$$S_{A3} = K_{A3}\rho f_v^2 \quad (4)$$

Furthermore, pulse signal $P_v$ appearing at the output end of Schmitt trigger 39, which is independent of the amplitude of the vortex signal, is delivered to a frequency voltage converter 55. Frequency voltage converter 55 comprises a constant pulse width converting circuit 551, and an integrating circuit 552. Pulse signal $P_v$ is converted by constant pulse width converting circuit 551 into a constant pulse width frequency signal having a constant pulse width, i.e. a pulse signal $P_{vc}$. Pulse signal $P_{vc}$ is integrated by integrating circuit 552. The thus integrated signal is outputted by integrating circuit 552 to a function generator 56. In this case, since the pulse signal, having a constant pulse width and being proportional to the vortex frequency $f_v$, is integrated, a signal, which is proportional to the vortex frequency $f_v$, is delivered to the function generator 56.

In frequency generator 56, the integrated signal appearing at the output end of integrating circuit 552 is squared so that a squared frequency signal or vortex signal $S_{V3}$ is outputted at the output end of function generator 56. Signal $S_{V3}$ is defined as follows.

$$S_{V3} = K_{V3} f_v^2 \quad (5)$$

A comparator 57, acting as a noise discriminating means, compares vortex signal $S_{A3}$ given by expression (4) with the vortex signal $S_{V3}$ given by expression (5). When the relationship $S_{A3} > S_{V3}$ holds, comparator 57 switches "on" gate circuit 50 to deliver the pulse signal $P_v$. On the other hand, when the relationship $S_{A3} < S_{V3}$ holds, comparator 57 delivers the OFF signal $S_{off}$ to switch "off" the gate circuit 50.

Figure 15:
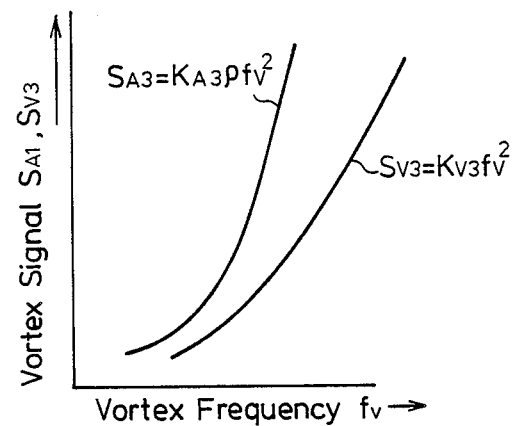
FIG. 15 is a characteristic diagram depicting operation of the embodiment of FIG. 14.

FIG. 15 is a graph for explaining the operation of the embodiment of FIG. 14 wherein the constants are selected so as to satisfy the following.

$$K_{A3}\rho > K_{V3} \quad (6)$$

Therefore, when the fluid of $Q_M$ is flowing, the relationship $S_{A3} > S_{V3}$ always holds, as shown in FIG. 15. Gate circuit 50 is ON. Pulse signal $P_v$ is delivered. However, when flow rate $Q_M$ is zero, the noise generated becomes an output which is independent of density $\rho$ that the coefficicent of $S_{A3}$ becomes small correspondingly. The relationship $S_{A3} < S_{V3}$ holds and gate circuit 50 is never switched "on".

In this way, it is possible to distinguish between the noise signal when the flow rate is zero and the vortex signal. Zero drift is lessened.

The operation of switch circuit 53 of FIG. 14 will now be described. Since switch circuit 53 is configured so as to be switched "on" in synchronization with pulse signal $P_v$ of Schmitt trigger 39, its starting behavior is stabilized. That is, where there is no switch circuit 53, small noise, having a magnitude no larger than the threshold width of Schmitt trigger 39, appears at the output end of rectifying circuit 52 even in the zero flow rate state. As a result, such noise is integrated by the integrating circuit 54. The relationship $S_{A3} > S_{V3}$ holds in the zero flow rate state. Gate circuit 50 is kept in the ON state. In this state, if a noise larger than the threshold width of the Schmitt trigger 39 enters, a pulse resulting from such noise is delivered, which noise cannot be distinguished from the vortex signal.

To avoid the foregoing condition, therefore, switch circuit 53 is configured so as to be switched "on" in synchronization with pulse signal $P_v$ delivered upon flowing of the fluid. The system for eliminating the influence of pulse like impulse wave noise that is brought about when it enters the converting unit will now be described with reference to FIGS. 16(a)–16(c), wherein it is assumed that the time constant of integrating circuit 552 of FIG. 14 is selected to be small as compared with the time constant of integrating circuit 54.

Figure 16A:
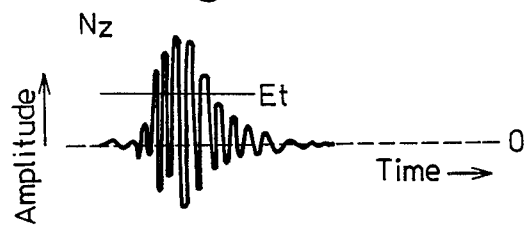
FIGS. 16(a)–16(c) are diagrams depicting the impulse wave treating operation of the embodiment of FIG. 14.
Figure 16B:
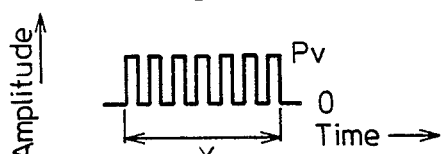
Figure 16C:
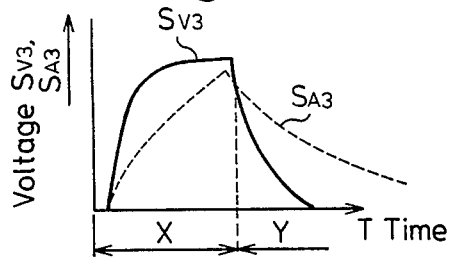

When impulse wave like noise $N_Z$, which is larger than trigger level $E_t$ of Schmitt trigger 39, enters as shown in FIG. 16(a), pulse signal $P_v$ is delivered at the output end of Schmitt trigger 39 during a period X in which the noise exceeds trigger level $E_t$, as shown in FIG. 16(b). As a result, since the time constant of circuit 552 is selected to be small as compared with the time constant of integrating circuit 54, the rising rate of vortex signal $S_{A3}$ during period X is slow as compared with that of vortex signal $S_{V3}$, as shown in FIG. 16(c), so that the relationship $S_{A3} < S_{V3}$ is maintained. As a result, gate circuit 50 is OFF, and noise $N_Z$ is never delivered.

On the other hand, a period Y (see FIG. 16(c)) in which noise $N_Z$ is absent, subsequent to period X, is different from period X. That is, because of the differences in the time constants, inversion takes place, and the relationship $S_{A3} > S_{V3}$ holds. Gate circuit 50 is ON. However, since noise $N_Z$ has disappeared, there is no pulse signal $P_v$ present. Through the foregoing operation, the impulse wave like noise is effectively eliminated.

Figure 17:
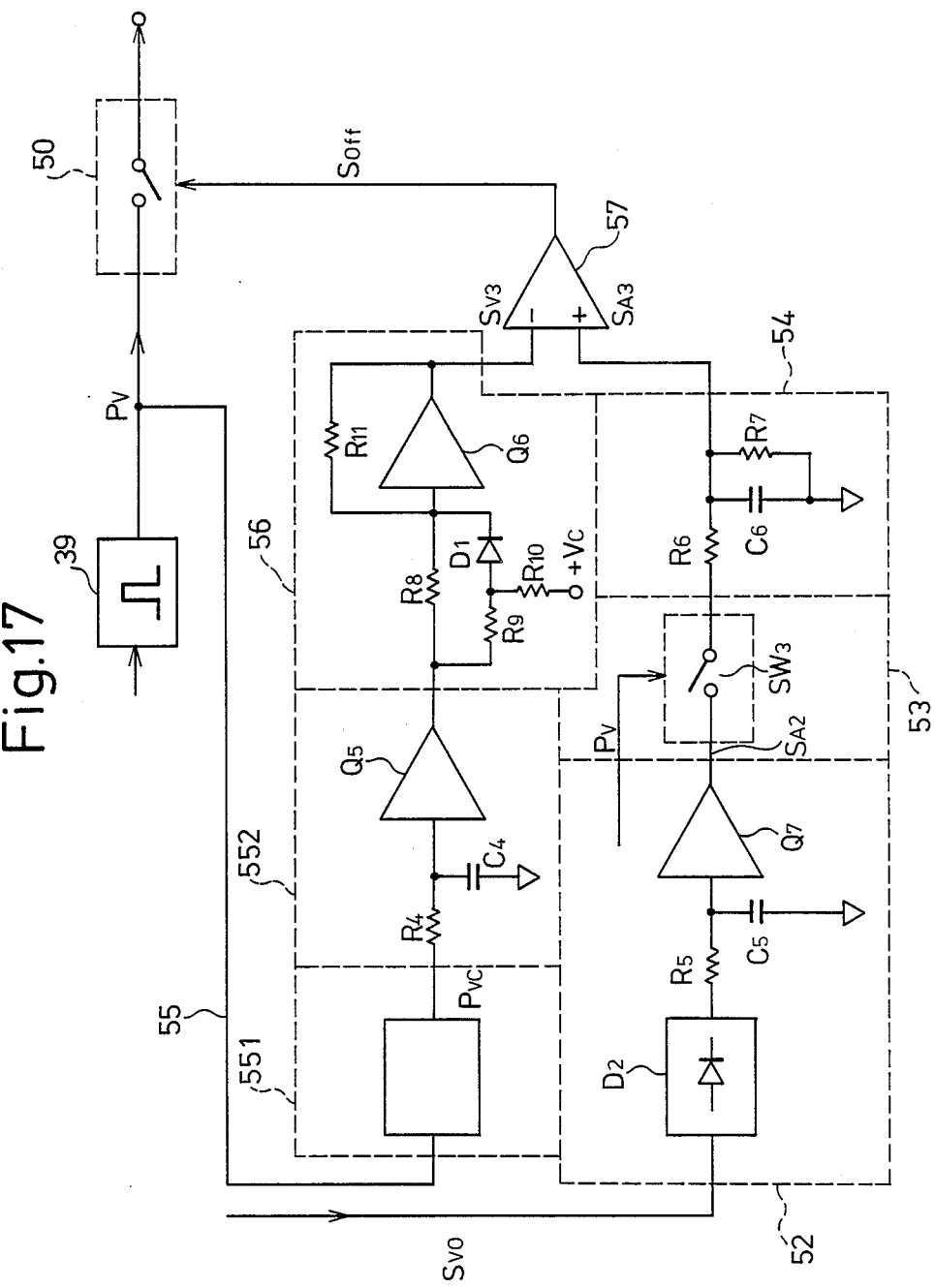
FIG. 17 is a circuit diagram depicting in greater detail the structure of the embodiment of FIG. 14.

FIG. 17 shows in greater detail, an important portion of the embodiment of FIG. 14, wherein constant pulse width converting circuit 551 can be made of, for example, a monostable circuit. The output of the monostable circuit, i.e. an impulse signal $P_{vc}$ of constant pulse width, is integrated by an integrating circuit 552 comprising capacitor $C_4$ and resistor $R_4$. After passing through an amplifier $Q_5$, the pulse signal $P_{vc}$ is delivered to function generator 56 for performing a square calculation.

Function generator 56 comprises an input resistor $R_8$, a feedback resistor $R_{11}$, resistors $R_9$ and $R_{10}$, and a diode $D_1$. The output voltage from amplifier $Q_5$ is applied through input resistor $R_8$ to input terminal of an amplifier $Q_6$ which has a feedback path extending from its output terminal through feedback resistor $R_{11}$ to its input terminal. Connected across input resistor $R_8$ is a series circuit comprising resistor $R_9$ and diode $D_1$. At the midpoint or connecting point between resistor $R_9$ and diode $D_1$, a voltage $+V_c$ is applied through resistor $R_{10}$. With the foregoing structure, a square calculation is performed, so that vortex signal $S_V$, proportional to the square of vortex frequency $f_v$, is delivered at the output end of amplifier $Q_6$. It should be noted that voltage $+V_c$ determines the turning point of square calculation.

On the other hand, vortex signal $S_{V0}$ is rectified by a rectifier $D_2$ comprising, for example, a diode, and the resulting output is applied through a filter, comprising resistor $R_5$ and capacitor $C_5$, to an amplifier $Q_7$ so that vortex signal $S_{A2}$ which is proportion to the amplitude, is delivered at the output terminal of amplifier $Q_7$. Vortex signal $S_{A2}$ is switched "on" and "off" by a switch $SW_3$ in synchronization with pulse signal $P_y$ and, delivered to integrating circuit 54. The output of circuit 54 is a signal proportional to the frequency of pulse signal $P_y$.

Integrating circuit 54 comprises resistors $R_6$ and $R_7$ and a capacitor $C_6$. The signal $S_{A2}$ is applied through resistor $R_6$ to the parallel circuit comprising resistors $R_7$ and capacitor $C_6$, so that a vortex signal $S_{A3}$ is generated at the output end of circuit 54 and applied to comparator 57. The function of resistor $R_7$ is to discharge the electric charge stored in capacitor $C_6$ when switch $SW_3$ is OFF. The time constant $R_6C_6$ for integration, is selected to be large as compared with the time constant $R_4C_4$, defined by resistor $R_4$ and capacitor $C_4$.

Figure 18:
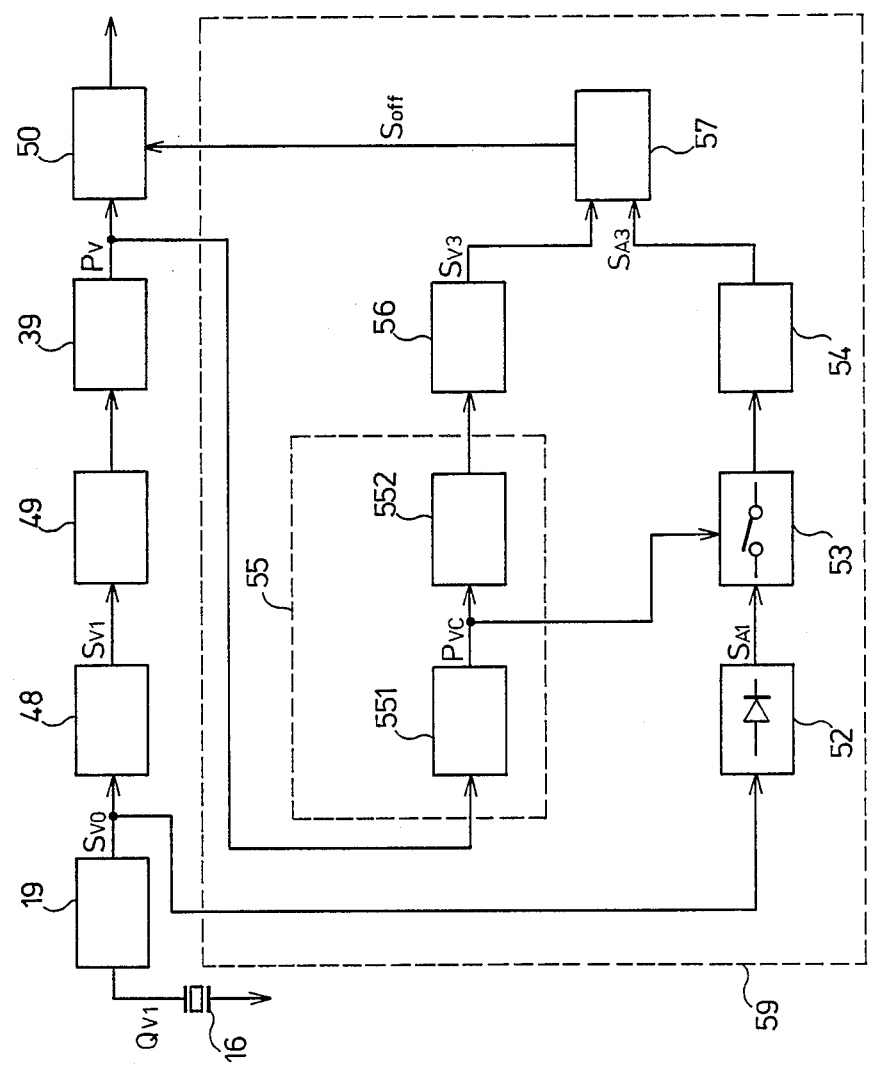
FIG. 18 is a block diagram depicting a modification of the embodiment of FIG. 14.

FIG. 18 shows a modification of the embodiment of FIG. 14 wherein a noise discriminating/eliminating circuit 59 of the embodiment of FIG.18 differs from the noise discriminating/eliminating circuit 58 of FIG. 14. A control signal for controlling switch circuit 53 is derived from pulse signal $P_{vc}$ which is outputted from constant pulse width converting circuit 551.

According to circuit of FIG. 14, if the duty ratio of the noise $N_z$ is about 50%, as is the case with the pulse signal $P_y$ resulting from the vortex signal, vortex signal $S_{A3}$ corresponds to the vortex frequency, which creates no problems. However, if there occurs an irregular fluctuation, such as piping vibration or noise resulting from pulsating pressure, the duty ratio of the pulse signal appearing at the output end of Schmitt trigger 39 varies, so that vortex signal $S_{A3}$ becomes different from one corresponding to vortex frequency $f_y$, thereby causing erroneous operation.

To prevent the occurrence of such a situation, pulse signal $P_y$ is passed through constant pulse width converting circuit 551 to make the duty ratio always constant and circuit 53 is switched "on" and "off".

As will be appreciated, the above embodiment can thus cope with irregular noise.

With respect to FIGS. 10–18, although the $K_{A1}$ in expression (1) the $K_{A3}$ in expression (4), and the gain of function generator 56 have been described as being fixed, these parameters may be set to be proportional to the density $\rho$ of the fluid to be measured.

Figure 19:
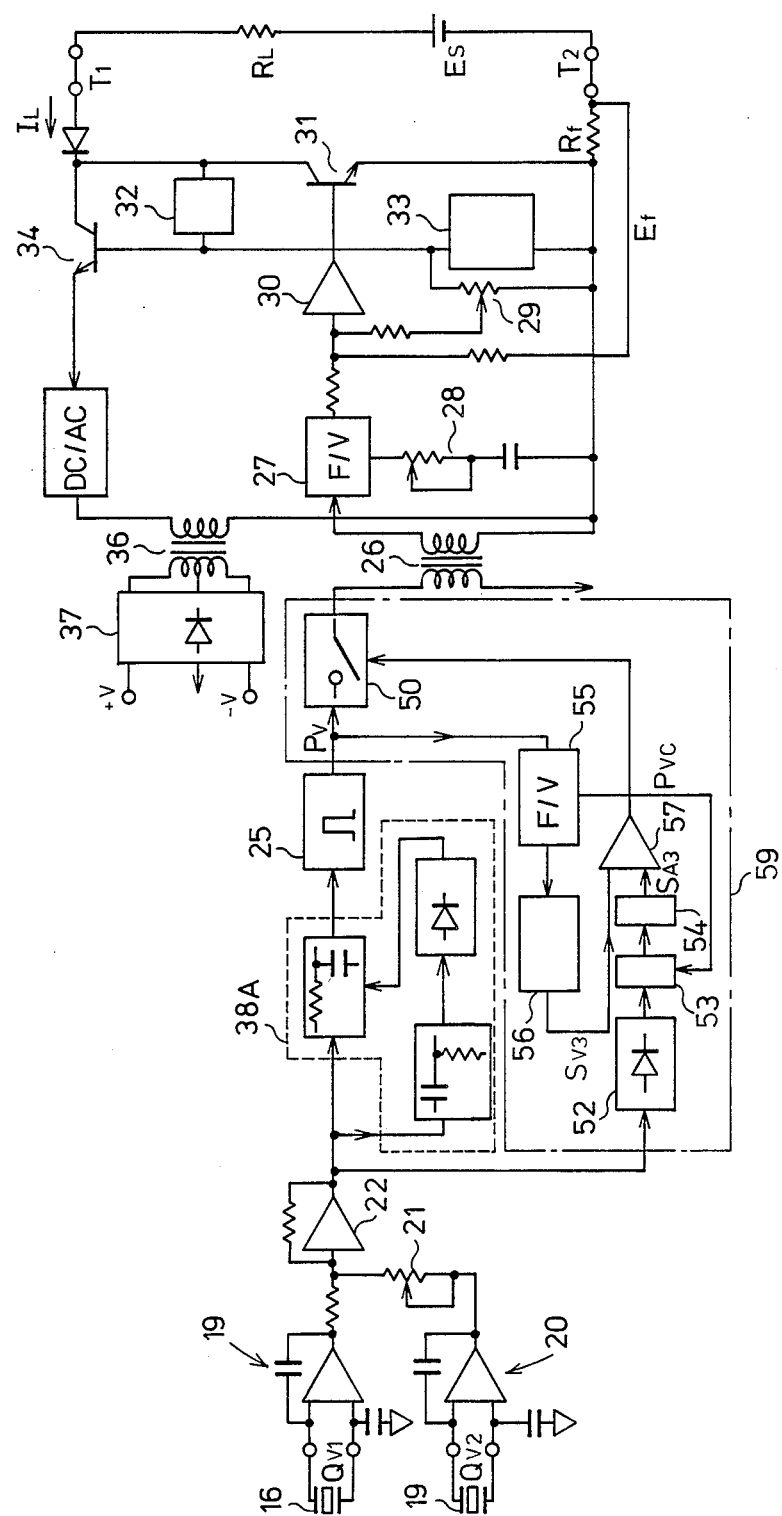
FIG. 19 is a block diagram depicting the overall structure, including several important portions of the foregoing embodiments.

FIG. 19 shows important portions of the above embodiments. The output of adder 22 is delivered to both tracking filter section 38A and noise discriminating-/eliminating circuit 59. Tracking filter section 38A performs the processing described with reference to FIG. 5(a) on the output of adder 22 and delivers the result to, for example, Schmitt trigger 25. On the other hand, the noise discriminating/eliminating circuit 59 performs the processing described with reference to, for example, FIG. 18, on the output of adder 22 and delivers the result to transformer 26. Transformer 26 and circuit components depicted to the right thereof perform the processing described with reference to FIG. 2 so that the result is transmitted through a two-wire transmission path to receiving resistor $R_L$.

Figure 20:
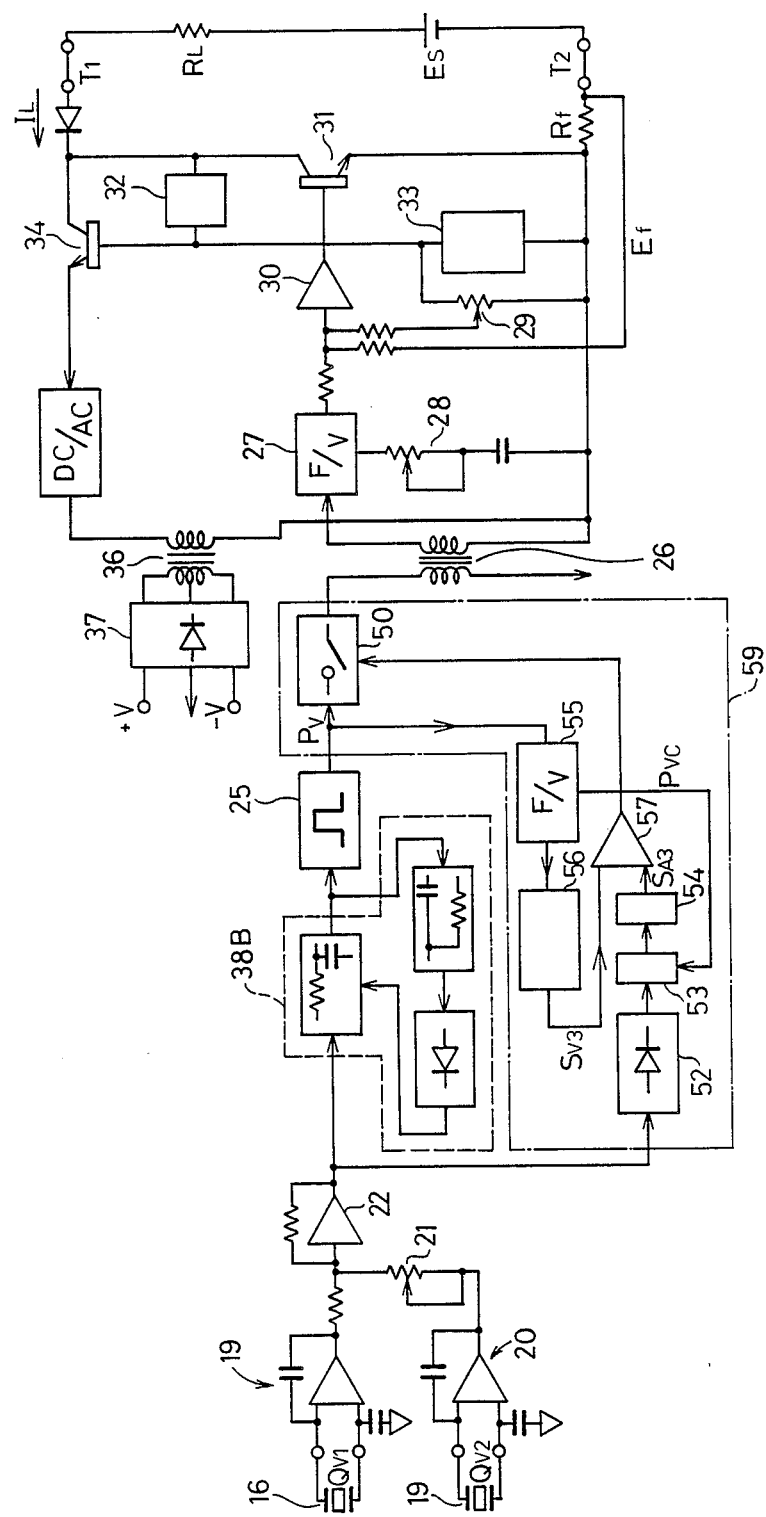
FIG. 20 is a block diagram depicting the structure of FIG. 19 with an important part thereof modified.

FIG. 20 shows an embodiment identical with the of FIG. 19, except that tracking filter section 38A is replaced with tracking filter section 38B shown in FIG. 5(b).

Although the above embodiments have been described as comprising discrete parts, they may be embodied using, for example, a microcomputer by making use of appropriate software.

The foregoing description is directed to vortex flowmeters of the type in which the output sensitivity of the vortex sensor is proportional to the square of the vortex frequency. However, it is to be understood, that the invention can be applied to other types of vortex flowmeters, such as for example, one in which the sensitivity is proportional to the vortex frequency, such as of the heat sensitive type.

Advantageously, the invention enables the realization of a vortex flowmeter which effectively eliminates such large high frequency noise as could not be eliminated by conventional low pass filters. Also, in the invention, advantageously, the zero drift resulting from noise appear on the vortex generating member when the flow rate is zero. Moreover the invention effectively handles pulse like impulse wave noise.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A vortex flowmeter comprising
   signal converting means for converting a flow rate to be measured into a vortex signal and for producing an output indicative thereof;
   low pass filtering means for low pass filtering the output of said signal converting means and for producing an output;
   frequency converting means for converting the output of said low pass filtering means into a frequency signal corresponding to the flow rate to be measured;
   amplitude detecting means for detecting the amplitude of the output of said signal converting means and for generating a control signal corresponding to the amplitude without using the output from the low pass filtering means as a comparison; and
   changing means for changing the corner frequency of said low pass filtering means in accordance with said control signal.

2. A vortex flowmeter comprising
   signal converting means for converting a flow rate to be measured into a vortex signal and for producing an output indicative thereof;
   low pass filtering means for low pass filtering the output of said signal converting means and for producing an output;
   frequency converting means for converting the output of said low pass filtering means into a frequency signal corresponding to the flow rate to be measured;
   amplitude detecting means for detecting the amplitude of the output of said low pass filtering means to generate a control signal corresponding to said amplitude without using the output from the signal converting means as a comparison; and
   changing means for changing the corner frequency of said low pass filtering means in accordance with said control signal.

3. A vortex flowmeter comprising signal converting means for converting a flow rate to be measured into a vortex signal and for producing an output indicative thereof;

low pass filtering means for receiving said output of said signal converting means and for producing an output, said low pass filtering means comprising a fixed low pass filter comprising a fixed resistor and a fixed capacitor, and a series circuit comprising an auxiliary capacitor and a switch, said series circuit being connected in parallel to said fixed capacitor;

frequency converting means for converting the output of said low pass filtering means into a frequency signal corresponding to said flow rate; and amplitude comparing means for comparing an amplitude signal corresponding to the amplitude of said output of said signal converting means with a set voltage corresponding to the corner frequency of said low pass filtering means and for generating a control signal when the amplitude signal exceeds the set voltage; wherein said switch is switched "on" in accordance with said control signal.

4. The flowmeter of claim 3, wherein said low pass filtering means comprises a plurality of series circuits, and a corresponding plurality of amplitude comparing means, and wherein the switch of each of said series circuits is controlled individually by a control signal from said corresponding comparing means.

5. A vortex flowmeter comprising signal converting means for converting a flow rate to be measured into a vortex signal and for producing an output indicative thereof;

low pass filtering means for receiving the output of said signal converting means and for producing an output, said low pass filtering means comprising a fixed low pass filter comprising a fixed resistor and a first fixed a capacitor, and a variable low pass filter comprising a field effect transistor and a second fixed capacitor as a subsequent stage of said fixed low pass filter;

frequency converting means for converting the output of said low pass filtering means into a frequency signal corresponding to the flow rate; and amplitude detecting means for detecting the amplitude of the output of said signal converting means to generate a control signal corresponding to the amplitude, wherein a gate voltage is applied to said field effect transistor and is changed in accordance with the control signal to change the corner frequency of said variable low pass filter.

6. A vortex flow meter comprising signal converting means for converting a flow rate to be measured into a vortex signal and for producing an output indicative thereof;

a low pass filter for low pass filtering the vortex signal and for producing an output;

frequency converting means for converting the output of said low pass filter into a frequency signal corresponding to said flow rate;

a high pass filter means comprising a high pass filter and a rectifying means for detecting high frequency noise contained in the output of said signal converting means and for producing a control signal without using the output from said low pass filter as a comparison; and means for changing the corner frequency of said low pass filter in accordance with said control signal.

7. A vortex flowmeter comprising signal converting means for converting a flow rate to be measured into a vortex signal and for producing an output indicative thereof;

a low pass filter for low pass filtering said vortex signal and for producing an output;

frequency converting means for converting the output of said low pass filter into a frequency signal corresponding to said flow rate;

a high pass filter for detecting high frequency noise contained in said output of said low pass filter and for producing an output; and rectifying means for detecting and rectifying said output of said high pass filter, wherein the corner frequency of said low pass filter is changed in accordance with the output of said rectifying means.

8. A vortex flowmeter comprising signal converting means for converting a flow rate to be measured into a vortex signal and for producing an output indicative thereof;

frequency detecting means for detecting the frequency of said output of said signal converting means to generate a frequency signal and for producing an output frequency;

amplitude detecting means for detecting the amplitude of the output of said signal converting means to generate an amplitude signal;

noise discriminating means for comparing the frequency signal with the amplitude signal to generate an OFF signal when the frequency signal is greater than a given value and the frequency signal is small compared with the amplitude signal; and gate means for switching "off" the output frequency of said frequency detecting means in accordance with the OFF signal.

9. The flowmeter of claim 8, wherein the given value is set to a frequency corresponding to a lower limit value of the flow rate.

10. The flowmeter of claim 8, wherein the given value is set to a frequency signal corresponding to a flow rate of zero.

11. A vortex flowmeter comprising signal converting means for converting a flow rate to be measured into a vortex signal and for producing an output indicative thereof;

frequency detecting means for detecting the frequency of the output of said signal converting means to generate a frequency signal;

frequency converting means for receiving the frequency signal and converting said frequency signal into a square frequency signal proportional to the square of the frequency signal and for producing an output frequency;

amplitude detecting means for detecting the amplitude of the output of said signal converting means to generate an amplitude signal;

noise discriminating means for comparing the square frequency signal with the amplitude signal to generate an OFF signal when the square frequency signal is small as compared with the amplitude signal; and gate means for switching "off" the frequency signal of said frequency detecting means in accordance with the OFF signal.

12. A vortex flow meter comprising signal converting means for converting a flow rate to be measured into a vortex signal and for producing an output indicative thereof;

frequency detecting means for detecting the frequency of the output of said signal converting means to generate a frequency signal;
converting means for converting said frequency signal into a constant pulse width frequency signal having a constant pulse width;
first integrating means for integrating the constant pulse width frequency signal to generate a first integral signal corresponding to said frequency signal;
frequency converting means for converting said first integral signal into a square frequency signal proportional to the square of said frequency signal;
rectifying means for converting the amplitude of said output of said signal converting means into an amplitude signal;
switch means for switching "on" and "off" the amplitude signal in synchronization with said frequency signal and for producing an output;
second integrating means for integrating the output of said switch means to generate a second integral signal corresponding to the amplitude signal;
noise discriminating means for delivering an OFF signal when the square frequency signal is small as compared with the second integral signal; and
gate means for switching "off" the frequency signal of said frequency detecting means in accordance with the OFF signal.

13. The flow meter of claim 12, wherein said first integrating means has an integration time constant which is small as compared with that of said second integrating means.

14. A vortex flowmeter comprising
signal converting means for converting a flow rate to be measured into a vortex signal and for producing an output indicative thereof;
frequency detecting means for detecting the frequency of the output of said signal converting means to generate a frequency signal;
converting means for converting said frequency signal into a constant pulse width frequency signal having a constant pulse width;
first integrating means for integrating the constant pulse width frequency signal to generate a first integral signal corresponding to said frequency signal;
frequency converting means for converting said first integral signal into a square frequency signal proportional to the square of said frequency signal;
rectifying means for converting the amplitude of said output of said signal covering means into an amplitude signal;
switch means for switching "on" and "off" said amplitude signal in synchronization with the constant pulse width frequency signal and for producing an output;
second integrating means for integrating the output of said switch means to deliver a second integral signal corresponding to the amplitude signal;
noise discriminating means for delivering an OFF signal when the square frequency signal is small as compared with said second integral signal; and
gate means for switching "off" the frequency signal of said frequency detecting means in accordance with the OFF signal.

15. The flowmeter of claim 14, wherein said first integrating means has an integration time constant which is small as compared with that of said second integrating means.

16. A vortex flowmeter comprising
signal converting means for converting a flow rate to be measured into a vortex signal and for producing an output;
tracking filter means for detecting the amplitude of said output of said signal converting means and for changing the corner frequency of a low pass filter in accordance with an amplitude detected to generate a filtered signal;
frequency converting means for discriminating the filtered signal in terms of a given threshold level and for converting the filtered signal into a frequency to generate a frequency signal;
noise discriminating means for receiving an amplitude signal relating to the amplitude of the output of said signal converting means and the frequency signal and for comparing them in terms of magnitude to generate an OFF signal when the frequency signal is small as compared with the amplitude signal;
a gate circuit for receiving the frequency signal, said gate circuit being rendered "off" in accordance with said OFF signal and for producing an output frequency; and
frequency current converting means for receiving the output frequency of said gate circuit and converting said output frequency into a current signal corresponding to said frequency signal.

17. A vortex flowmeter comprising
signal converting means for converting a flow rate to be measured into a vortex signal and for producing an output;
tracking filter means for detecting the amplitude of the output of said signal converting means, for outputting a filtered signal through a low pass filter, and for changing the corner frequency of said low pass filter in accordance with the amplitude of said filtered signal;
frequency converting means for discriminating the filtered signal in terms of a given threshold level and for converting said filtered signal into a frequency to generate a frequency signal;
noise discriminating means for receiving an amplitude signal relating to the amplitude of the output of said signal converting means and the frequency signal and for comparing said amplitude signal and said frequency signal in terms of magnitude to generate an OFF signal when the frequency signal is small as compared with the amplitude signal;
a gate circuit for receiving the frequency signal, said gate circuit being rendered "off" in accordance with said OFF signal and for producing and output frequency; and
frequency current converting means for receiving said output frequency of said gate circuit and converting said output frequency signal into a current signal corresponding to said frequency signal.

18. A vortex flowmeter comprising
signal converting means for converting a flow rate to be measured into a vortex signal and for producing an output indicative thereof;
low pass filtering means for low pass filtering the output of said signal converting means and for producing an output;

Schmitt trigger means for converting the output of said low pass filtering means into a frequency signal corresponding to the flow rate to be measured;

amplitude detecting means for detecting the amplitude of the output of said signal converting means and for generating a control signal corresponding to the amplitude;

changing means for changing the corner frequency of said low pass filtering means in accordance with said control signal, so that the corner frequency of said low pass filtering means is lowered when the amplitude of said vortex signal increases;

wherein high frequency noise component which increases in proportion to the amplitude of said vortex signal, is reduced relatively to said vortex signal, by said changing means which functions to lower the corner frequency of said low pass filtering means when the amplitude of said vortex signal increases; and wherein frequency signal error caught by said Schmitt trigger means when the high frequency noise increases, is eliminated.

19. A vortex flowmeter comprising signal converting means for converting a flow rate to be measured into a vortex signal and for producing an output indicative thereof;

low pass filtering means for low pass filtering the output of said signal converting means and for producing an output;

Schmitt trigger means for converting the output of said low pass filtering means into a frequency signal corresponding to the flow rate to be measured;

amplitude detecting means for detecting the amplitude of the output of said low pass filtering means to generate a control signal corresponding to said amplitude;

changing means for changing the corner frequency of said low pass filtering means in accordance with said control signal, so that the corner frequency of said low pass filtering means is lowered when the amplitude of said vortex signal increases;

wherein high frequency noise component which increases in proportion to the amplitude of said vortex signal, is reduced relatively to said vortex signal, by said changing means which functions to lower the corner frequency of said low pass filtering means when the amplitude of said vortex signal increases; and wherein frequency signal error caught by said Schmitt trigger means when the high frequency noise increases, is eliminated.

20. A vortex flowmeter comprising signal converting means for converting a flow rate to be measured into a vortex signal and for producing an output indicative thereof;

a low pass filter means for low pass filtering the vortex signal and for producing an output;

Schmitt trigger means for converting the output of said low pass filter means into a frequency signal corresponding to said flow rate;

a high pass filter for detecting high frequency noise contained in the output of said signal converting means and for producing an output;

rectifying means for detecting and rectifying the output of said high pass filter, and for outputting a noise signal;

changing means for changing the corner frequency of said low pass filter means in accordance with said noise signal, so that the corner frequency of said low pass filter means is lowered when the high frequency noise component superposed on said vortex signal is large;

wherein high frequency noise component which increases in proportion to the amplitude of said vortex signal, is reduced relatively to said vortex signal, by said changing means which functions to lower the corner frequency of said low pass filter means when the amplitude of said vortex signal increases; and wherein frequency signal error caught by said Schmitt trigger means when the high frequency noise increases, is eliminated.

* * * * *